United States Patent [19]
Roques et al.

[11] 3,965,034
[45] June 22, 1976

[54] METHOD FOR BREAKING FOAMS AND APPARATUS USEFUL THEREFOR

[75] Inventors: Henri Roques, Portet, Gar; Michel Roustan, Ramonville, both of France

[73] Assignee: Produits Chimiques Ugine Kuhlmann, Paris, France

[22] Filed: Feb. 12, 1973

[21] Appl. No.: 331,691

[30] Foreign Application Priority Data
Feb. 29, 1972  France .............................. 72.06865

[52] U.S. Cl. ............................... 252/321; 252/358; 252/361
[51] Int. Cl.² .................... B01D 19/00; B01D 19/02
[58] Field of Search ......... 252/321, 358, 361, 477 R

[56] References Cited
UNITED STATES PATENTS

| | | | |
|---|---|---|---|
| 1,871,004 | 8/1932 | Lopez | 252/477 R |
| 2,435,205 | 2/1948 | Davis et al. | 252/321 X |
| 2,544,564 | 3/1951 | Peterson et al. | 252/321 X |
| 3,268,456 | 8/1966 | Fruth | 252/321 X |

FOREIGN PATENTS OR APPLICATIONS

| | | |
|---|---|---|
| 1,805,360 | 5/1970 | Germany |
| 1,945,048 | 3/1971 | Germany |

OTHER PUBLICATIONS

Chemical Abstracts: vol. 75, 1971, 22032n.

*Primary Examiner*—Richard D. Lovering
*Attorney, Agent, or Firm*—Pennie & Edmonds

[57] ABSTRACT

A method for breaking foams is disclosed which comprises passing the foam to be broken through a packing material which is chemically inert with respect to the foam and which consists essentially of glass, plastic or metal having a coating thereon of a compound of the formula $CF_3-(CF_2)_n-X$, wherein $n$ is a whole number between 3 and 9, X is a functional group such as $C_2H_4-SO_3-C_4H_9$, said coating forming a stable composition with the packing material substrate.

7 Claims, 2 Drawing Figures

3,965,034

METHOD FOR BREAKING FOAMS AND APPARATUS USEFUL THEREFOR

BACKGROUND OF THE INVENTION

1. Field of the Invention

This invention relates to the field of methods for breaking foams and apparatus useful therefor.

II. Description of the Prior Art

The problem of breaking foams is frequently encountered when untimely foams are involved, for example foams formed during fermentation, mixing or manipulation of reactants or in dye baths or foams intentionally produced in the techniques of concentration, separation and fractionation by foaming.

Numerous solutions have been proposed to break foams but none of them have been fully satisfactory. Foam-breaking methods of the centrifugal, chemical, thermal and sonic type are known. The effectiveness of centrifugal foam-breakers is very uncertain. They are complex, consume energy and very often dessicate the foam without breaking it. Chemical foam-breakers require the addition of an anti-foaming agent which brings about the rupture of the foam. The anti-foaming agents employed, for example the silicone oils, are often expensive and present contamination problems. Thermal foam-breakers are based on the fact that a significant increase or decrease in temperature can destroy the stability of foams, however, foam-breakers of this type often require a significant input of energy and can often lead to the cracking of certain fragile molecules. The sonic foam-breakers which are employed are of the ultrasonic type. They are uneconomical and permit breaking of only a small volume of foam.

SUMMARY OF THE INVENTION

A simple and highly efficacous method and apparatus for breaking foams has been discovered which possesses none of the drawbacks of the methods employed heretobefore. The method of the instant invention consists in the use of packing across which the foam to be brroken is circulated.

DESCRIPTION OF THE PREFERRED EMBODIMENTS

Figure 1:
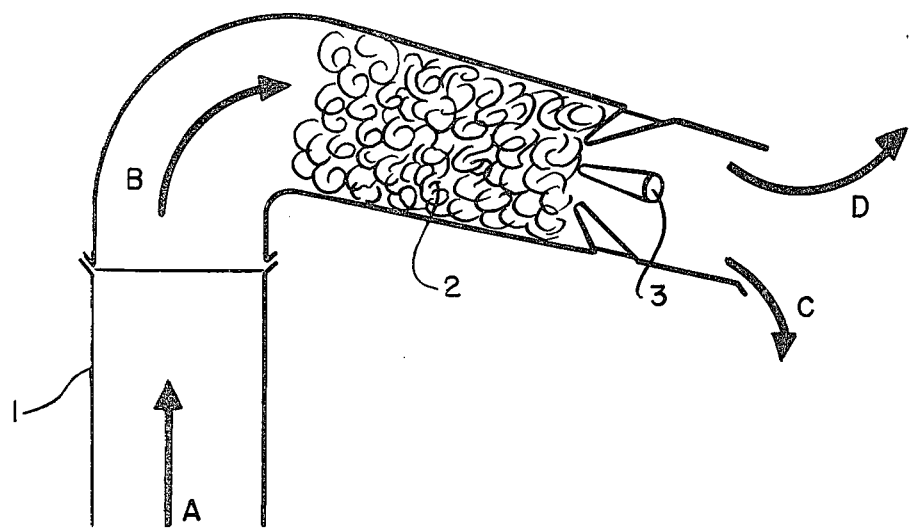
FIG. 1 represents one embodiment of apparatus which can be employed for carrying out the foam-breaking method of this invention.

The packing through which the foams to be broken are circulated can be of any solid material which is chemically inert with respect to the foam, but especially advantageous results have been obtained using fluorinated resins, in particular polytetrafluoroethylene (PTFE), or glass, plastic materials or metals treated with a fluorocarbon derivative.

The material constituting the packing can be of diverse appropriate shapes. For example, the packing can be in the form of Raschig rings, turnings or chips. The condition of the surface of the material constituting the packing can have an influence on the results obtained; in general, it can be stated that a porous surface favors breaking of the foams.

The foam is made to traverse the packing, according to the instant invention, by any appropriate means which can be readily determined for a particular foam by one skilled in the art. For example, the packing can be disposed within a tube and the foam to be broken can be made to traverse the packing with the aid of a carrier gas. At the end of the tube, the liquid resulting from the broken foam is obtained, the carrier gas escapes from this same end and can, if necessary or desirable, be recovered. Examples of carrier gases which can advantageously be used herein include air, hydrogen, oxygen, nitrogen, carbon dioxide and so forth. The velocity of the foam across the packing and the length of the packing zone are factors which can be readily and conveniently determined by one skilled in the art for a particular case. The packing can also be disposed between two grills forming an apparatus in the shape of a disk. This disk can be moved through the foam to be broken or while the disk is maintained in a fixed position with respect to the upper surface of the foam, the foam can be made to traverse the disk with the aid of an aspirating pump or an agitator optionally cooperating with a circulation of gas. The gas used to entrain the foam can be any one of several appropriate gases, as for example, air, hydrogen, oxygen, nitrogen or carbon dioxide.

It has been observed that especially advantageous results are obtained by the use of packing which has been treated with a fluorocarbon of the general formula

wherein $n$ is a whole number between 3 and 9 and X is a functional group capable of providing a stable composition with the substrate.

For a substrate of metal packing material, for example ordinary steel, stainless steel or copper, a coating of the fluorocarbons disclosed in French patent application 71/43253 filed Dec. 2, 1971 and issued on July 2, 1973 as French Pat. No. 2,163,808, assigned to Ugine Kuhlmann can be advantageously employed. French patent application 71/43253, issued as French Pat. No. 2,163,808, teaches inter alia the following fluorocarbon derivatives having a functional group X consonant with the above formula: $C_8F_{17} - C_2H_4 - SO_3H$; $C_8F_{17} - (C_2H_4)_2$ ' COOH; $C_8F_{17} - (C_2H_4)_5 - COOH$; $C_8F_{17} - C_2H_3 Cl - O - PO_3 H_2$; $C_6F_{13} - C_2H_3 Cl - O - PO_3 H_2$; $C_8F_{17} - C_2H_4 OH$; $C_8F_{17} - (C_2H_4)_2 OH$; $C_8F_{17} - C_2H_4(OH)_2$; $C_8F_{17} - C_2H_4 - NH - C_6H_5$; $C_8F_{17} - C_2H_4 - SO_2 - NH_2$; $C_8F_{17} - C_2H_4 - SO_2 - NH - C_2H_4N(C_2H_5)_2$; $C_6F_{13} - C_2H_4 - SO_2 - NH - (CH_2)_6 OH$; $C_8F_{17} - C_2H_4 - SO_2 - NH - (CH_2)_6 - OH$; $C_6F_{13} - C_2H_4 - SO_2 - N(CH_3) - C_2H_4 OH$; $C_8F_{17} - C_2H_4 - SO_2 - N(CH_3) - C_2H_4 OH$; $C_8F_{17} - C_2H_4 - SO_2 - N(CH_3) - CH_2 - COOH$; $C_6F_{13} - C_2H_4 - SO_2 - N(CH_3) - CH_2 - COOH$; $C_8F_{17} - C_2H_4 SH$. For a substrate of PVC, the fluorocarbon derivatives corresponding to the formula $C_6F_{13} - C_2H_4 - SO_3 - C_4H_9$, commercially available from Société des Produits Chimiques Ugine Kuhlmann under the Name SON-D-1 or any of the following can be advantageously employed:

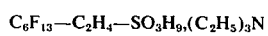

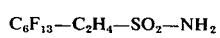

The treatment of the packing material with the fluorocarbon derivative can be carried out using any known and conventional means, for example, by soaking the packing material for several minutes in a solution of the fluorocarbon derivative, or by applying a solution of the fluorocarbon derivative with a brush or an aerosol sprayer. The material thus treated is then dried. To prepare the aforesaid solution of fluorocarbon derivative, any solvent which simultaneously provides good solvency for the fluorocarbon selected and a degree of volatility sufficient for its convenient elimination can be used. Examples of such solvents which can be advantageously employed for this purpose include the alcohols, in particular methanol and ethanol, the ketones, in particular acetone, and the halogenated derivatives, in particular chloroform, trichloroethylene and trichlorotrifluoroethane commercialized by Société des Produits Chimiques Ugine Kuhlmann under the name Forane 113.

The concentration of fluorocarbon derivative in the solvent can vary between about 0.1 and 10% and advantageously 0.1 and 1% by weight.

Moreover, it can be advantageous to provide certain packing materials with a surface condition permitting good adhesion of the fluorocarbon derivative such as disclosed in the aforementioned French patent application 71/43253, issued on July 2, 1973 as French Pat. No. 2163,808.

The fluorocarbon derivative can also be incorporated into the mass of plastic material before molding of the latter. The fluorinated derivative migrates towards the surface of the plastic material thus forming a permanent coating.

Table I hereinafter give the results for breaking foams employing various kinds of packings. There will be noted from an examination of these results, the decided improvements in foam-breaking properties of PVC which, untreated, did not break any of the foams of the surface active agents tested and which when treated by soaking in a 1% solution of SON-D-1 in Forane 113, completely broke the foams of cetyl pyridinium chloride, lauryl benzyl trimethyl ammonium chloride, lauryl sodium sulfate and lauryl benzene sodium sulfonate.

It will also be noted that PTFE also possesses good anti-forming properties. This material can break the foams of numerous surface active agents as well as fermentation foams.

TABLE I (X = foam broken; O = foam not broken; XO = foam incompletely broken)

| FOAM | PACKING MATERIALS | | | |
|---|---|---|---|---|
| | PTFE | Polyethylene | PVC | PVC treated with SON-D-1 |
| Cetyl pyridinium chloride | X | X | O | X |
| Tetradecyl pyridinium bromide | X | XO | O | XO |
| Lauryl pyridinium chloride | X | X | O | — |
| Lauryl trimethyl ammonium chloride | O | O | O | XO |
| Cetyl trimethyl ammonium chloride | O | O | O | — |
| Lauryl benzyl trimethyl ammonium chloride | O | O | O | X |
| Cetyl dimethyl benzyl ammonium chloride | X | X | O | — |
| Lauryl sodium sulfate | O | O | O | X |
| Lauryl benzene sodium sulfonate | O | O | O | X |

Figure 2:
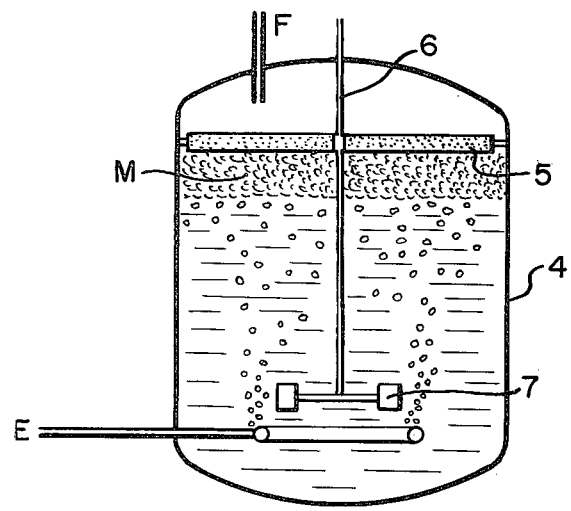
FIG. 2 represents another embodiment of apparatus which can be employed for carrying out the foam breaking method of this invention.

The invention will further be understood by reference to FIGS. 1 and 2 of the drawings.

FIG. 1 represents one embodiment of apparatus which can advantageously be employed for carrying out the foam-breaking method of this invention. The foam is made to enter through bent tube 1 through A by means of a carrier gas, arrives at B and then traverses packing 2 which is kept in place by Vigreux points 3. The liquid resulting from the broken foam is recovered at C while the carrier gas escapes at D. This apparatus can be readily equipped with thermostatic control (not shown), for example, with a jacket surrounding tube 1. Similarly, the apparatus can also be equipped with means for circulating the liquid recovered at C (not shown) if necessary or desirable.

FIG. 2 represents another embodiment of apparatus which can advantageously be employed for carrying out the foam-breaking method of this invention. The liquid producing the foam to be broken, M, is contained in vessel 4 equipped with an agitator 6 having paddles 7. Disposed within vessel 4 above the upper surface of foam M is a planar disc of packing material 5. A gas introduced into vessel 4 through E escapes therefrom through F. The foam, forced by agitation cooperating with the circulation of the gas across the packing is broken within the latter.

The method and apparatus of the instant invention find numerous applications. They can be used for breaking the foams in dye baths and fermentation vessels. They can also be advantageously employed in techniques of enrichment, separation and fractionation by foaming. A fairly complete bibliography has been prepared by LEMLICH (Adsorption Bubbles Separation Method, IEC, 1968-60-10, pages 16–22) concerning foaming techniques. The foaming technique is applicable not only to extraction or separation of naturally foaming products but is also useful for the extraction of non-foaming products with the aid of a surface active agent added to the solution to be treated. One of the major problems in these techniques is the possibility of breaking the resulting foams in a simple and effective manner while recovering the components. It appears that numerous techniques of fractionation, enrichment and separation by foaming have not been effectively exploited for want of an appropriate foam-breaking method. The method of breaking foams according to the instant invention provides an effective response to these problems.

The following Examples are illustrative of the method and apparatus of this invention.

EXAMPLE 1

An apparatus analogous to that described in FIG. 1 was employed. The tube which was of glass had in the narrow portion thereof a packing of 4cm diameter and was filled as shown in FIG. 1 along 10 cm of its length with PVC turnings treated by soaking for several minutes followed by drying in air at ambient temperature in a 1% solution of SON-D-1 in Forane 113. The PVC turnings which were used had a thickness of 2/10 mm and a length of 5 mm.

The foam which consisted of cetyl pyridinium chloride was made to traverse the packing by means of a carrier gas, in this case, air. The rate of flow of air was 350 $cm^3$/min. The cetyl pyridinium chloride foam was completely broken after passage through the first 5 cm of packing.

EXAMPLE 2

This example illustrates the application of the instant invention in the process of enrichment by foaming.

A 350 mg/liter aqueous solution of cetyl pyridinium chloride is foamed. This foam was broken employing substantially the same method and apparatus as in EXAMPLE 1, except that a packing of PTFE was utilized. The liquid resulting from the broken foam had a concentration of 650 mg/liter.

We claim:

1. A method for breaking foams of surface active agents or fermentation which comprises passing the foam to be broken through a packing material which is chemically inert with respect to the foam and which consists essentially of:

glass, plastic or metal having a coating thereon of a compound of formula $$CF_3—(CF_2)_n—X$$

wherein $n$ is a whole number between 3 and 9 and X is selected from the group of $C_2H_4$—$SO_3$—$C_4H_9$; $C_2H_4$—$SO_3H$; $C_2H_4$—$SO_3H_9$, $(C_2H_5)_3N$; $C_2H_4$—$SO_2$—$NH_2$; $(C_2H_4)_2$—COOH; $(C_2H_4)_5$—COOH; $C_2H_3Cl$—O—$PO_3H_2$; $C_2H_3Cl$—O—$PO_3H_2$; $C_2H_4OH$; $(C_2H_4)_2OH$; $C_2H_4(OH)_2$; $C_2H_4$—NH—$C_6H_5$; $C_2H_4$—$SO_2$—$NH_2$; $C_2H_4$—$SO_2$—NH—$C_2H_4N(C_2H_5)_2$; $C_2H_4$—$SO_2$—NH—$(CH_2)_6OH$; $C_2H_4$—$SO_2$—NH—$(CH_2)_6$—OH; $C_2H_4$—$SO_2$—$N(CH_3)$—$C_2H_4OH$; $C_2H_4$—$SO_2$—$N(CH_3)$—$C_2H_4OH$; $C_2H_4$—$SO_2$—N—$(CH_3)$—$CH_2$—COOH; $C_2H_4$—$SO_2$—$N(CH_3)$—$CH_2$—COOH and $C_2H_4SH$, said coating forming a stable composition with the packing material substrate 2. The method of claim 1 in which the material comprising the packing is in the shape of Raschig rings or turnings.

3. The method of claim 1 in which the coating is porous.

4. In the method of enrichment, fractionation and separation by forming, in which a foam is produced, the improvement comprising passing the foam through a packing material which is chemically inert with respect to the foam to break the foam and provide a liquid, and recovering the liquid resulting from the broken foam, said packing material consisting essentially of:

glass, plastic or metal having a coating thereon of a compound of formula $$CF_3—(CF_2)_n—X$$

wherein $n$ is a whole number between 3 and 9 and X is selected from the group of $C_2H_4$—$SO_3$—$C_4H_9$; $C_2H_4$—$SO_3H$; $C_2H_4$—$SO_3H_9$, $(C_2H_5)_3N$; $C_2H_4$—$SO_2$—$NH_2$; $(C_2H_4)_2$—COOH; $(C_2H_4)_5$—COOH; $C_2H_3Cl$—O—$PO_3H_2$; $C_2H_3Cl$—O—$PO_3H_4OH$; $(C_2H_4)_2OH$; $C_2H_4(OH)_2$; $C_2H_4$—NH—$C_6H_5$; $C_2H_4$—$SO_2$—$NH_2$; $C_2H_4$—$SO_2$—NH—$CH_2H_4N(C_2H_5)_2$; $C_2H_4$—$SO_2$—NH—$(CH_2)_6OH$; $C_2H_4$—$SO_2$—NH—$(CH_2)_6$—OH; $C_2H_4$—$SO_2$—$N(CH_3)$—$C_2H_4OH$; $C_2H_4SO_2$—$N(CH_3)$—$C_2H_4OH$; $C_2H_4$—$SO_2$—N—$(CH_3)$—$CH_2$—COOH; $C_2H_4$—$SO_2$—$N(CH_3)$—$CH_2$—COOH and $C_2H_4SH$, said coating forming a stable composition with the packing material substrate 5. Apparatus for breaking foams of surface active agents, fermentation or foams produced in the method of enrichment, fractionation and separation by foaming, which comprises a. a packing material consisting essentially of
glass, plastic or metal having a coating thereon of a compound of formula $$CF_3—(CF_2)_n—X$$

wherein $n$ is a whole number between 3 and 9 and X is selected from the group of $C_2H_4$—$SO_3$—$C_4H_9$; $C_2H_4$—$SO_3H$; $C_2H_4$—$SO_3H_9$, $(C_2H_5)_3N$; $C_2H_4$—$SO_2$—$NH_2$; $(C_2H_4)_2$—COOH; $(C_2H_4)_5$—COOH; $C_2H_3Cl$—O—$PO_3H_2$; $C_2H_3Cl$—O—$PO_3H_2$; $C_2H_4OH$; $(C_2H_4)_2$—OH; $C_2H_4(OH)_2$; $C_2H_4$—NH—$C_6H_5$; $C_2H_4$—$SO_2$—$NH_2$; $C_2H_4$—$SO_2$—NH—$C_2H_4N(C_2H_5)_2$; $C_2H_4$—$SO_2$—NH—$(CH_2)_6OH$; $C_2H_4$—$SO_2$—NH—$(CH_2)$— 6—OH; $C_2H_4$—$SO_2$—$N(CH_3)$—$C_2H_4OH$; $C_2H_4$—$SO_2$—$N(CH_3)$—$C_2H_4OH$; $C_2H_4$—$SO_2$—N— $(CH_3)$—$CH_2$—COOH; $C_2H_4$—$SO_2$—$N(CH_3)$—$CH_2$—COOH and $C_2H_4SH$, said coating forming a stable composition with the packing material substrate, and b. means for passing the foam to be broken through the packing.

6. The apparatus of claim 5 in which the packing material is in the shape of Raschig rings or turnings and wherein said packing material is disposed within a tube accommodating the passage of the foam to be broken therethrough.

7. The apparatus of claim 5 in which the packing material is in the shape of Raschig rings or turnings and wherein said packing material is arranged in the form of a disc and disposed on its flat surface upon or in close proximity with the surface of the foam to be broken.

* * * * *

UNITED STATES PATENT AND TRADEMARK OFFICE
CERTIFICATE OF CORRECTION

PATENT NO. : 3,965,034
DATED : June 22, 1976
INVENTOR(S) : Henri Roques et al.

It is certified that error appears in the above-identified patent and that said Letters Patent are hereby corrected as shown below:

Column 1, line 43, change "brroken" to --broken--

Column 2, line 47, eliminate the apostrophe after the formula $(C_2H_4)_2$ and insert a dash.

Column 3, line 68, change "anti-forming" to --anti-foaming--

Column 5, line 66, change "forming" to --foaming--

*Signed and Sealed this*

Twelfth Day of October 1976

[SEAL]

*Attest:*

RUTH C. MASON
*Attesting Officer*

C. MARSHALL DANN
*Commissioner of Patents and Trademarks*